United States Patent
Cudak et al.

(10) Patent No.: US 11,790,627 B2
(45) Date of Patent: Oct. 17, 2023

(54) USING AN OBJECT KEY TO DEPRIORITIZE PROCESSING OF RELATIVE REGIONS

(71) Applicant: Lenovo Global Technology (United States) Inc., Morrisville, NC (US)

(72) Inventors: Gary D Cudak, Wake Forest, NC (US); Fred Allison Bower, III, Durham, NC (US); Srihari V. Angaluri, Raleigh, NC (US); Ajay Dholakia, Cary, NC (US); David W. Cosby, Raleigh, NC (US); Jian Li, Durham, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 29 days.

(21) Appl. No.: 17/580,459

(22) Filed: Jan. 20, 2022

(65) Prior Publication Data

US 2023/0230336 A1 Jul. 20, 2023

(51) Int. Cl.
*G06V 10/22* (2022.01)
*G06T 7/246* (2017.01)
(Continued)

(52) U.S. Cl.
CPC ............ *G06V 10/225* (2022.01); *G06T 7/246* (2017.01); *G06T 7/60* (2013.01); *G06T 7/73* (2017.01);
(Continued)

(58) Field of Classification Search
CPC .. G06V 30/1448; G06V 10/225; G06T 7/246; G06T 7/73; G06T 7/60; G06T 2207/30196; G06T 2207/30204
See application file for complete search history.

(56) References Cited

U.S. PATENT DOCUMENTS

| 8,055,076 B2 * | 11/2011 | Kikuchi | G11B 27/28 |
| | | | 382/226 |
| 2012/0095589 A1 * | 4/2012 | Vapnik | G06Q 30/06 |
| | | | 700/132 |

(Continued)

FOREIGN PATENT DOCUMENTS

| KR | 20110104686 A | * | 9/2011 |
| KR | 20200030932 A | * | 3/2020 |
| WO | WO-2019109242 A1 | * | 6/2019 |

OTHER PUBLICATIONS

T. Anezaki, K. Eimon, S. Tansuriyavong and Y. Yagi, "Development of a human-tracking robot using QR code recognition," 2011 17th Korea-Japan Joint Workshop on Frontiers of Computer Vision (FCV), Ulsan, Korea (South), 2011, pp. 1-6, doi: 10.1109/FCV.2011.5739699. (Year: 2011).*

(Continued)

*Primary Examiner* — Michael Robert Cammarata
(74) *Attorney, Agent, or Firm* — Kunzler Bean & Adamson; Bruce R. Needham

(57) ABSTRACT

A method for using an object key to deprioritize processing of relative regions of images of an object includes capturing an image of an object to be tracked and selecting an object key of the object. The object key includes a portion of the object, the object key is attached to the object and is recognizable by an image capture device. The method includes calculating a relative size of the object key with respect to a size of the object and a location of the object key with respect to the object, and tracking one or more locations of the object from the relative size and location of the object with respect to the object key and by capturing a plurality of images of the object key at a resolution sufficient for tracking movement of the object key.

18 Claims, 6 Drawing Sheets

(51) Int. Cl.
*G06T 7/73* (2017.01)
*G06T 7/60* (2017.01)
*H04N 23/61* (2023.01)

(52) U.S. Cl.
CPC ... *H04N 23/61* (2023.01); *G06T 2207/10048* (2013.01); *G06T 2207/30196* (2013.01)

(56) References Cited

U.S. PATENT DOCUMENTS

| | | | | |
|---|---|---|---|---|
| 2013/0016876 | A1* | 1/2013 | Wooley | H04N 23/61 382/103 |
| 2013/0088600 | A1* | 4/2013 | Wu | H04N 7/18 348/149 |
| 2013/0106833 | A1* | 5/2013 | Fun | G06T 7/73 345/419 |
| 2013/0324243 | A1* | 12/2013 | Mikhailov | G06F 3/012 463/31 |
| 2015/0297949 | A1* | 10/2015 | Aman | G06T 7/246 348/157 |
| 2017/0278266 | A1* | 9/2017 | Hassan | G06T 7/248 |
| 2018/0350084 | A1* | 12/2018 | Tamir | G06T 7/292 |
| 2019/0035089 | A1* | 1/2019 | Ishiyama | G06F 3/014 |
| 2021/0042917 | A1* | 2/2021 | Hirai | G06T 7/246 |
| 2021/0158536 | A1* | 5/2021 | Li | G06T 7/20 |
| 2021/0264159 | A1* | 8/2021 | Yuen | G06V 10/56 |
| 2021/0271879 | A1* | 9/2021 | Brown | G06V 40/172 |
| 2022/0180105 | A1* | 6/2022 | Chen | G06V 20/80 |
| 2022/0409298 | A1* | 12/2022 | Haider | A61B 5/1076 |
| 2023/0093631 | A1* | 3/2023 | Kim | G06F 16/7867 |

OTHER PUBLICATIONS

Morar A, Moldoveanu A, Mocanu I, Moldoveanu F, Radoi IE, Asavei V, Gradinaru A, Butean A. A Comprehensive Survey of Indoor Localization Methods Based on Computer Vision. Sensors (Basel). May 6, 2020;20(9):2641. doi: 10.3390/s20092641. PMID: 32384605; PMCID: PMC7249029. (Year: 2020).*

N. Park, W. Lee and W. Woo, "Barcode-Assisted Planar Object Tracking Method for Mobile Augmented Reality," 2011 International Symposium on Ubiquitous Virtual Reality, Jeju, Korea (South), 2011, pp. 40-43, doi: 10.1109/ISUVR.2011.20. (Year: 2011).*

S. D. Roy, S. D. Tran, L. S. Davis and B. S. Vikram, "Multi-resolution Tracking in Space and Time," 2008 Sixth Indian Conference on Computer Vision, Graphics & Image Processing, Bhubaneswar, India, 2008, pp. 352-358, doi: 10.1109/ICVGIP.2008.74. (Year: 2008).*

James Le, "The 5 Computer Vision Techniques That Will Change How You See the World", Heartbeat, Apr. 12, 2018, pp. 1-26.

Yunpeng Li, "Location Recognition using Prioritized Feature Matching", ECCV, Cornell University, Ithaca, NY, Sep. 5, 2010, pp. 1-14.

* cited by examiner

USING AN OBJECT KEY TO DEPRIORITIZE PROCESSING OF RELATIVE REGIONS

FIELD

The subject matter disclosed herein relates to image processing and more particularly relates to using an object key to deprioritize processing of relative regions of images of an object.

BACKGROUND

Video analytics is becoming increasingly used and expanding out to edge computing. Many of the edge computing systems are rugged and limited in processing power, or may not have a high bandwidth pipe through which to send streams for processing elsewhere. Often, these devices may be attached to one or more cameras.

BRIEF SUMMARY

A method for using an object key to deprioritize processing of relative regions of images of an object is disclosed. An apparatus and computer program product also perform the functions of the apparatus. The method includes capturing an image of an object to be tracked and selecting an object key of the object. The object key includes a portion of the object, the object key is attached to the object and is recognizable by an as image capture device. The method includes calculating a relative size of the object key with respect to a size of the object and a location of the object key with respect to the object, and tracking one or more locations of the object from the relative size and location of the object with respect to the object key and by capturing a plurality of images of the object key at a resolution sufficient for tracking movement of the object key.

An apparatus for using an object key to deprioritize processing of relative regions of images of an object includes a processor and a memory storing code. The code is executable by the processor to perform operations that include capturing an image of an object to be tracked and selecting an object key of the object. The object key includes a portion of the object, the object key is attached to the object and is recognizable by an image capture device. The operations include calculating a relative size of the object key with respect to a size of the object and a location of the object key with respect to the object, and tracking one or more locations of the object from the relative size and location of the object with respect to the object key and by capturing a plurality of images of the object key at a resolution sufficient for tracking movement of the object key.

A program product for using an object key to deprioritize processing of relative regions of images of an object includes a non-volatile computer readable storage medium storing code. The code is configured to be executable by a processor to perform operations that include capturing an image of an object to be tracked, selecting an object key of the object, where the object key includes a portion of the object, the object key is attached to the object and is recognizable by an image capture device. The operations include calculating a relative size of the object key with respect to a size of the object and a location of the object key with respect to the object, and tracking one or more locations of the object from the relative size and location of the object with respect to the object key and by capturing a plurality of images of the object key at a resolution sufficient for tracking movement of the object key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
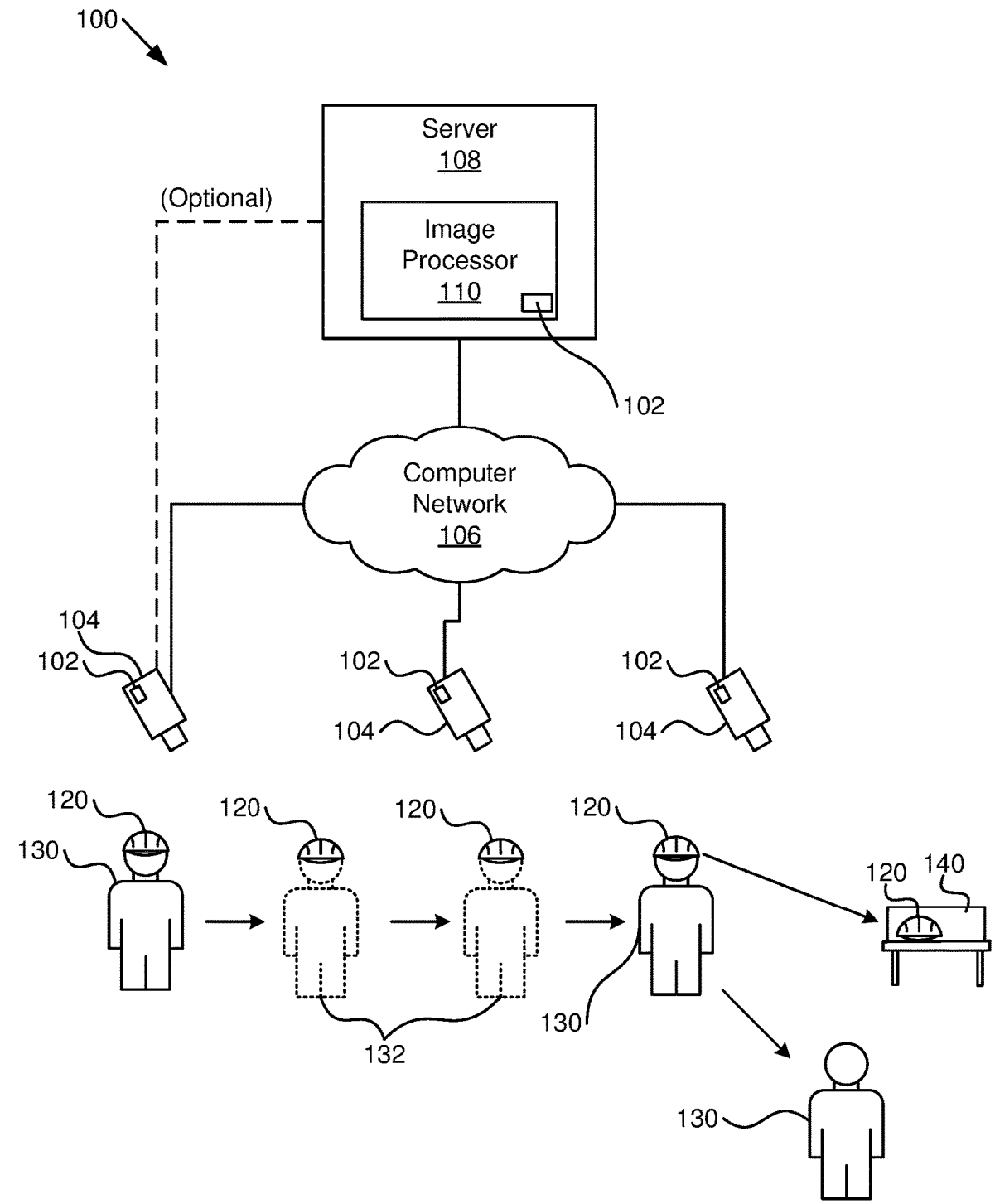
FIG. 1 is a schematic block diagram illustrating a system for using an object key to deprioritize processing of relative regions of images of an object, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission. The storage devices, in some embodiments, do not embody signals.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium, in some embodiments, is a computer readable storage medium. The computer readable storage medium, in some embodiments, is a storage device storing the code. The storage device, in various embodiments, includes but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device. When a computer readable storage device is non-volatile, the non-volatile storage device is non-transitory.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on an image capture device or image processing device, partly on an image capture device or image processing device, as a stand-alone software package, partly on the image capture device or image processing device and partly on a remote computer or entirely on the remote computer or server. In the latter scenario, the remote computer may be connected to the image capture device or image processing device through any type of network, including a local area network ("LAN"), a wide area network ("WAN"), or the like, or the connection may be made to an external computer (for example, through the Internet using an Internet Service Provider).

Reference throughout this specification to "one embodiment," "an embodiment," "some embodiments," or similar language means that a particular feature, structure, or characteristic described in connection with the embodiment is included in at least one embodiment. Thus, appearances of the phrases "in one embodiment," "in an embodiment," "in some embodiments," "in other embodiments," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of various embodiments.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code, modules, controllers, etc. When implemented in code, the code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks. The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiments. For instance, an arrow may indicate a waiting or monitoring period of unspecified duration between enumerated steps of the depicted embodiments. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for using an object key to deprioritize processing of relative regions of images of an object is disclosed. An apparatus and computer program product also perform the functions of the apparatus. The method includes capturing an image of an object to be tracked and selecting an object key of the object. The object key includes a portion of the object, the object key is attached to the object and is recognizable by an image capture device. The method includes calculating a relative size of the object key with respect to a size of the object and a location of the object key with respect to the object, and tracking one or more locations of the object from the relative size and location of the object with respect to the object key and by capturing a plurality of images of the object key at a resolution sufficient for tracking movement of the object key.

In some embodiments, tracking the one or more locations of the object includes capturing images of portions of the object that are not the object key at a lower resolution and/or a lower rate than a resolution and/or rate sufficient for tracking movement of the object key. In other embodiments, tracking the one or more locations of the object includes capturing images of the object key without capturing images of portions of the object that are not the object key. In other embodiments, the method includes periodically capturing an image of portions of the object that are not the object key at a resolution sufficient to verify that the object is still attached to the object key. In other embodiments, the method includes determining a degree of attachment between the object and the object key, determining a verification rate based on the degree of attachment, where a higher degree of attachment results in a lower verification rate than a lower degree of attachment, and periodically capturing, at the verification rate, an image of the object at a resolution sufficient to verify that the object is still attached to the object key.

In some embodiments, the captured image of the object is captured with an image capture device. The captured plurality of images of the object key are captured using one or more image capture devices. In other embodiments, one or more image capture devices capturing the image of the object and the plurality of images of the object key use visible light, infrared light, and/or thermal imaging. In other embodiments, the method includes identifying, in response to capturing the image of the object, the object key within the image of the object. The object key is a recognizable element of the object with physical properties sufficient for tracking the one or more locations of the object by capturing the plurality of images of the object key.

In some embodiments, the method includes identifying, in response to capturing the image of the object, a plurality of potential object keys within the image of the object, determining a degree of attachment between each of the plurality of potential object keys and the object, and determining a degree of recognizability of each of the plurality of potential object keys. The degree of recognizability of an object key of the plurality of potential object keys includes a measure of physical properties of the object key sufficient for tracking the one or more locations of the object by capturing the plurality of images of the object key. In the embodiments, selecting the object key of the object includes selecting an object key of the plurality of potential object keys based on the degree of attachment and the degree of recognizability of each object key of the plurality of potential object keys.

In some embodiments, the method includes, in response to calculating the relative size of the object key with respect to the size of the object and the location of the object key with respect to the object, determining a pixel range of the portions of the object that are not the object key. Tracking the one or more locations of the object includes capturing pixels of portions of the object that are not the object key at a lower resolution and/or a lower rate than a resolution and/or rate sufficient for tracking movement of the object key. In further embodiments, capturing pixels of portions of the object that are not the object key at a lower resolution and/or a lower rate than a resolution and/or rate sufficient for tracking movement of the object key includes deprioritizing processing of the pixels of the portions of the object that are not the object key, lowering a fidelity of the pixels of the portions of the object that are not the object key, and/or avoiding sending the pixels of the portions of the object that are not the object key to a remote processing entity.

An apparatus for using an object key to deprioritize processing of relative regions of images of an object includes a processor and a memory storing code. The code is executable by the processor to perform operations that include capturing an image of an object to be tracked and selecting an object key of the object. The object key includes a portion of the object, the object key is attached to the object and is recognizable by an image capture device. The operations include calculating a relative size of the object key with respect to a size of the object and a location of the object key with respect to the object, and tracking one or more locations of the object from the relative size and location of the object with respect to the object key and by capturing a plurality of images of the object key at a resolution sufficient for tracking movement of the object key.

In some embodiments, tracking the one or more locations of the object includes capturing images of portions of the object that are not the object key at a lower resolution and/or a lower rate than a resolution and/or rate sufficient for tracking movement of the object key, and/or capturing images of the object key without capturing images of portions of the object that are not the object key. In other embodiments, the operations further include periodically capturing an image of portions of the object that are not the object key at a resolution sufficient to verify that the object is still attached to the object key. In other embodiments, the operations further include determining a degree of attachment between the object and the object key, determining a verification rate based on the degree of attachment, where a higher degree of attachment results in a lower verification rate than a lower degree of attachment, and periodically capturing, at the verification rate, an image of the object at a resolution sufficient to verify that the object is still attached to the object key.

In some embodiments, the captured image of the object is captured with an image capture device, and where the captured plurality of images of the object key are captured using one or more image capture devices. In other embodiments, the operations further include identifying, in response to capturing the image of the object, the object key within the image of the object, where the object key is a recognizable element of the object with physical properties sufficient for tracking the one or more locations of the object by capturing the plurality of images of the object key.

In some embodiments, the operations further include identifying, in response to capturing the image of the object, a plurality of potential object keys within the image of the object, determining a degree of attachment between each of the plurality of object keys and the object, and determining a degree of recognizability of each of the plurality of object keys. The degree of recognizability of an object key of the plurality of object keys includes a measure of physical properties of the object key sufficient for tracking the one or more locations of the object by capturing the plurality of images of the object key. In the embodiments, selecting the object key of the object includes selecting an object key of the plurality of object keys based on the degree of attachment and the degree of recognizability of each object key of the plurality of object keys.

A program product for using an object key to deprioritize processing of relative regions of images of an object includes a non-volatile computer readable storage medium storing code. The code is configured to be executable by a processor to perform operations that include capturing an image of an object to be tracked, selecting an object key of the object, where the object key includes a portion of the object, the object key is attached to the object and is recognizable by an image capture device. The operations include calculating a relative size of the object key with respect to a size of the object and a location of the object key with respect to the object, and tracking one or more locations of the object from the relative size and location of the object with respect to the object key and by capturing a plurality of images of the object key at a resolution sufficient for tracking movement of the object key.

In some embodiments, tracking the one or more locations of the object includes capturing images of portions of the object that are not the object key at a lower resolution and/or a lower rate than a resolution and/or rate sufficient for tracking movement of the object key.

FIG. 1 is a schematic block diagram illustrating a system 100 for using an object key to deprioritize processing of relative regions of images of an object, according to various embodiments. The system 100 includes an image processing apparatus 102 in each image capture device 104, a computer network 106, a server 108, with an image processor 110 that includes an image processing apparatus 102, an object key 120, and an object 130, which are described below.

The image processing apparatus 102 captures an image of the object 130 and selects and object key 120. The object 130 includes an object key 120 that is attached to the object 130 and the object key 120 is recognizable by an image capture device 104. In the depicted system 100 of FIG. 1, the object 130 is a person and the object key 120 is a hat worn by the person. The image processing apparatus 102 calculates a relative size of the object 130 with respect to the object key 120 and calculates a location of the object key 120 with respect to the object 130. The image processing apparatus 102 tracks one or more locations of the object 130 from the relative size and location of the object 130 with respect to the object key 120 and by capturing a plurality of images of the object key 120 at a resolution sufficient for tracking movement of the object key 120. In some embodiments, the image processing apparatus 102 periodically uses an image capture device to capture a full image of the object 130 with the object key 120 where the object 130 is captured at a higher resolution to verify that the object key 120 is still attached to the object 130. The image processing apparatus 102 is discussed in more detail below.

The system 100 includes one or more image capture devices 104 capable of capturing an image of the object key 120 and object 130. In some examples, an image capture devices 104 is a camera, a video camera, a portable electronic device with a camera, a smartphone with a camera, a security camera, a web cam, a game tracking camera, or other device capable of capturing images emitting light in the visible light spectrum. In other examples, the image capture devices 104 is a device capable of capturing images emitting infrared light. In other embodiments, the image capture devices 104 is a thermal imaging device.

In some embodiments, one or more of the image capture devices 104 are a stand-alone device. In other embodiments, one or more of the image capture devices 104 are embedded in another device. For example, the image capture devices 104 may be embedded in a drone, a computing device, in a piece of equipment, in a security apparatus, in a vehicle, or any other device capable of including an image capture devices 104. In some embodiments, the image capture devices 104 includes a pan feature, a tilt feature, and/or a zoom feature. In some embodiments, the image capture devices 104 is part of an apparatus that automatically tracks an object. In other embodiments, the image capture devices 104 includes a wide angle lens or some other mechanism to include create a wide field of view.

In some embodiments, the image capture devices 104 transmits raw data to the image processor 110. In other embodiments, the image capture devices 104 includes an image processor 110 and transmits one or more processed images to a server 108, to a data storage device, to a computing device for analysis, to an image processing application, or the like. While each image capture devices 104 and the image processor 110 of the server 108 in the system 100 of FIG. 1 includes an image processing apparatus 102, in some embodiments the image processing apparatus 102 includes a portion of the image processing apparatus 102 and the image processor 110 includes a portion of the image processing apparatus 102. In other embodiments, the image processor 110 of the server includes the image processing apparatus 102 while the image capture devices 104 don't include a portion of the image processing apparatus 102. In other embodiments, the image processing apparatus 102 is spread among or located on other computing devices. One of skill in the art will recognize other locations for all or a portion of the image processing apparatus 102.

The system 100 includes a computer network 106 that connects the image capture devices 104 to the server 108. In some embodiments, one or more of the image capture devices 104 are connected directly to the server 108. The computer network 106, in various embodiments, include a local area network ("LAN"), a wide area network ("WAN"), a fiber optic network, a wireless connection, the Internet, etc. or any combination of networks. The computer network 106 includes, in various embodiments, servers, cabling, routers, switches, and the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In some embodiments, the wireless connection employs connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The system 100 includes a server 108 with an image processor 110. In some embodiments, the image capture devices 104 transmit captured images to the server 108 for processing by the image processor 110. In other embodiments, each image capture device 104 includes some type of image processing capability and the image processor 110 of the server 108 performs other image processing functions, such as using captured image data from the various image capture devices 104 to track the object key 120. In some embodiments, the image processor 110 is a graphics processing unit ("GPU"). In other embodiments, the server 108 uses a central processing unit ("CPU"), an accelerator, a GPU, etc. to implement, execute, etc. the image processing apparatus 102. In some embodiments, the server 108 is a compute node in a rack, a blade server, a workstation, a desktop computer, a mainframe computer, a cloud computing device, or the like.

In the depicted system 100 of FIG. 1, the object 130 is a person and the object key 120 is a hat on the person. The system 100 of FIG. 1 depicts the person moving from left to right. After the initial image capture on the left, the image processing apparatus 102 tracks the hat while tracking the person at a lower resolution 132 (depicted as the person with dashed lines). The image processing apparatus 102 captures another full image of the person, which is the fourth image from the left. At that point the hat (object key 120) is placed on a bench 140 and the person (object 130) walks away, thus the object key 120 is separated from the object 130. The number of images of a person and a hat is for illustrative purposes only and one of skill in the art will recognize that more images may be captured.

In other embodiments, the object 130 is something else, such as a vehicle, a product on an assembly line, an animal, etc. The object key 120 changes as the object 130 changes. For example, where the object 130 is a vehicle, the object key 120 may be a license plate, a vehicle emblem, a rear-view mirror, a spoiler, or other element of the vehicle that is trackable. Where the object 130 is a product, such as a clock radio, such as a clock radio on an assembly line, the object key 120 may be a button, a display, an emblem, or other unique feature off the clock radio. Where the object 130 is an animal, the object key 120 may be a tail, a face, a marking of fur of a different color, or the like.

While the object key 120 is attached to the object 130, a degree of attachment between the object key 120 and the object 130 varies. For example, a hat has a much lower degree of attachment to a person than the face of the person would have to the rest of the person. In some embodiments, the degree of attachment between the object 130 and the object key 120 determines a verification rate, which is used herein as a rate at which the image processing apparatus 102 captures an image of the object 130 at a high enough resolution to determine if object key 120 is still attached to the object 130.

While the system 100 of FIG. 1 depicts a single object 130 being tracked, in some embodiments, the image processing apparatus 102 tracks identical objects 130, each with an identical object key 120. For example, the object 130 may be identical bottles on an assembly line and the object key 120 may be a bottle cap. Once the image processing apparatus 102 captures an image of a bottle on the assembly line and selects the bottle cap as the object key 120, as identical bottles with bottle caps go by, the image processing apparatus 102 captures images of the bottle caps and deprioritizes image capture of the bottles. In some embodiments, the image processing apparatus 102 periodically captures an image of the bottle at sufficient resolution to recognize features of the bottle and to verify that the bottle caps are attached.

Figure 2:
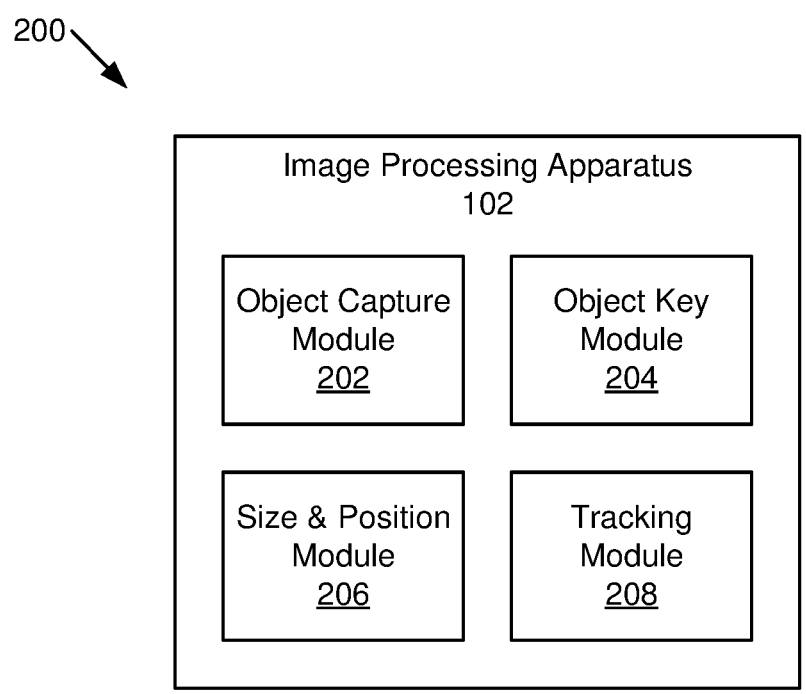
FIG. 2 is a schematic block diagram illustrating an apparatus for using an object key to deprioritize processing of relative regions of images of an object, according to various embodiments.

FIG. 2 is a schematic block diagram illustrating an apparatus 200 for using an object key 120 to deprioritize processing of relative regions of images of an object 130, according to various embodiments. The apparatus 200 includes an image processing apparatus 102 that includes an object capture module 202, an object key module 204, a size and position module 206, and a tracking module 208, which are described below.

The apparatus 200 includes an object capture module 202 configured to capture an image of an object 130 to be tracked. In some embodiments, the object capture module 202 receives input from a user to select an object 130 to be tracked prior to the object capture module 202 capturing an image of the object 130. In other embodiments, the image processing apparatus 102 automatically selects an object 130 to be tracked. For example, the image processing apparatus 102 may be part of a security system and may start tracking a person that enters a field of view of a particular image capture device 104. Selection of the object 130 is discussed in more detail below with respect to the apparatus 300 of FIG. 3.

The object capture module 202, in some embodiments, uses an image capture device 104 to capture the image of the object 130 to be tracked. The image capture device 104, in some embodiments, is one of a plurality of image capture devices 104. The image capture device 104 captures the image of the object 130 with enough resolution to identify features of the object 130, including features of potential object keys 120 of the object 130. In some embodiments, the object capture module 202 processes raw data from the image capture device 104 to produce an image of sufficient resolution to identify the object 130 and to identify an object key 120 from the captured image of the object 130.

The apparatus 200 includes an object key module 204 configured to select an object key 120 of the object 130. A portion of the object 130 includes an object key 120. The object key 120 is attached to the object 130 and is recognizable by an image capture device 104. In some embodiments, an object key 120 is defined by particular boundaries, such as edges, lines, etc. of the object key 120 to facilitate defining boundaries of the object key 120. In some embodiments, the object key module 204 identifies one or more potential object keys 120 within the image of the object 130 where the one or more potential object keys 120 are each a recognizable element of the object 130 with physical properties sufficient for tracking the one or more locations of the object 130 by capturing the plurality of images of the object key 120.

In some embodiments, the object key module 204 selects the object key 120 based on a minimum size limit. For example, the minimum size limit is a smallest size for an object key 120 based on capabilities of one or more image capture devices 104 that may be used to track the object 130 by tracking the object key 120. An object key 120 that is smaller than the minimum size limit may be difficult to identify from captured images of the object key 120. In some embodiments, the object key module 204 sets the minimum size limit based on potential distances between the object 130 and the image capture devices 104, pixel count capabilities of the image capture devices 104, lens quality of the image capture devices 104, and the like. In some embodiments, a user sets the minimum size limit. One of skill in the art will recognize other ways to set the minimum size limit.

In some embodiments, the object key module 204 selects an object key 120 to be below a certain percentage of an overall size of the object 130. A purpose of the image processing apparatus 102 is to reduce image processing load when tracking the object 130 so, in general, the smaller the object key 120 is with respect to the size of the object 130 the more reduction in processing there will be for the portions of the object 130 not including the object key 120. However, an amount of detail of the object key 120 may also affect processing load of the object key 120.

In some embodiments, the object key module 204 also evaluates recognizability of the object key 120 when selecting an appropriate object key 120. For example, a portion of the object 130 without recognizable features may be a poor candidate to be an object key 120 because an object key 120 without recognizable features is typically harder to track than an object key 120 with recognizable features. For example, a license plate of a vehicle may be a better candidate as an object key than a hood of the vehicle where the hood is devoid of features. However, where the image capture devices 104 are positioned overhead (for example in a drone) or are positioned high, the hood of the vehicle may be a good choice as an object key 120. Where a hood of a vehicle is use as an object key 120, the outline of the hood may be used to identify the hood. In addition, the hood may include stripes, ridges, or other features that may increase trackability of the hood. The object key module 204, in some embodiments, selects an object key 120 while balancing the minimum size limit, potential object keys 120, the overall size of the object 130, recognizable features of the object key 120, etc. One of skill in the art will recognize other ways for the object key module 204 to select an object key 120 attached to the object 130.

The apparatus 200 includes a size and position module 206 configured to calculate a relative size of the object key 120 with respect to a size of the object 130 and a location of the object key 120 with respect to the object 130. Calculating the relative size and location of the object key 120 with respect to the object 130, in some embodiments, provides a mechanism to know where the object 130 is when tracking the object key 120. For example, if the object key 120 is at the top of the object 130, then tracking the object key 120 indicates that the object 130 is below the object key 120.

Calculating a size of the object key 120 with respect to the object 130 provides a mechanism to understand how far the object 130 extends beyond the object key 120. When looking at a vertical dimension of the object 130 and object key 120, for example, if the object key 120 is at the top of the object 130 and has a vertical dimension that is 10 percent of the overall vertical dimension of the object 130 then the image processing apparatus 102 knows that 90 percent of the object 130 is below the object key 120.

In some embodiments, the size and position module 206 calculates a relative size and location of potential object keys 120 of the object 130 and coordinates with the object key module 204 to provide information for the object key module 204 to select an object key 120. In some examples, the size and position module 206 calculates the size of the object 130 and a size and location of each potential object key 120 to provide information to the object key module 204 to select an object key 120.

The apparatus 200 includes a tracking module 208 configured to track one or more locations of the object 130 from the relative size and location of the object 130 with respect to the object key 120 and by capturing a plurality of images of the object key 120 at a resolution sufficient for tracking movement of the object key 120. For example, an image capture device 104 captures an image of the object key 120 with enough resolution to identify the object key 120 and the tracking module 208 then determines a location of the object 130 based on the location of the object key 120 with respect to the object 130 and based on the size of the object 130. The tracking module 208 assumes that the object key 120 is attached to the object 130.

In some embodiments, the tracking module 208 tracking the one or more locations of the object 130 includes capturing images of portions of the object 130 that are not the object key 120 at a lower resolution and/or a lower rate than a resolution and/or rate sufficient for tracking movement of the object key 120. As used herein, capturing images of portions of the object 130 that are not the object key 120 at a lower resolution and/or a lower rate includes receiving raw data from the image capture device 104 and then processing the raw data at a lower resolution and/or at a lower rate than raw data corresponding to the object key 120, which results in an overall lower image processing load than processing raw data for the object 130 and object key 120 at a same resolution/rate.

In other embodiments, the tracking module 208 tracking the one or more locations of the object includes capturing images of the object key 120 without capturing images of portions of the object 130 that are not the object key 120. As used herein, capturing images of the object key 120 without capturing images of portions of the object 130 that are not the object key 120 includes processing raw data from an image capture device 104 of the object key 120 without processing raw data from the image capture device 104 for portions of the object 130 that are not the object key 120.

Beneficially, the image processing apparatus 102 provides a way to reduce image processing load when tracking an object 130. By tracking an object key 120 attached to the object 130, the image processing apparatus 102 is able to reduce image processing of the rest of the object 130.

Figure 3:
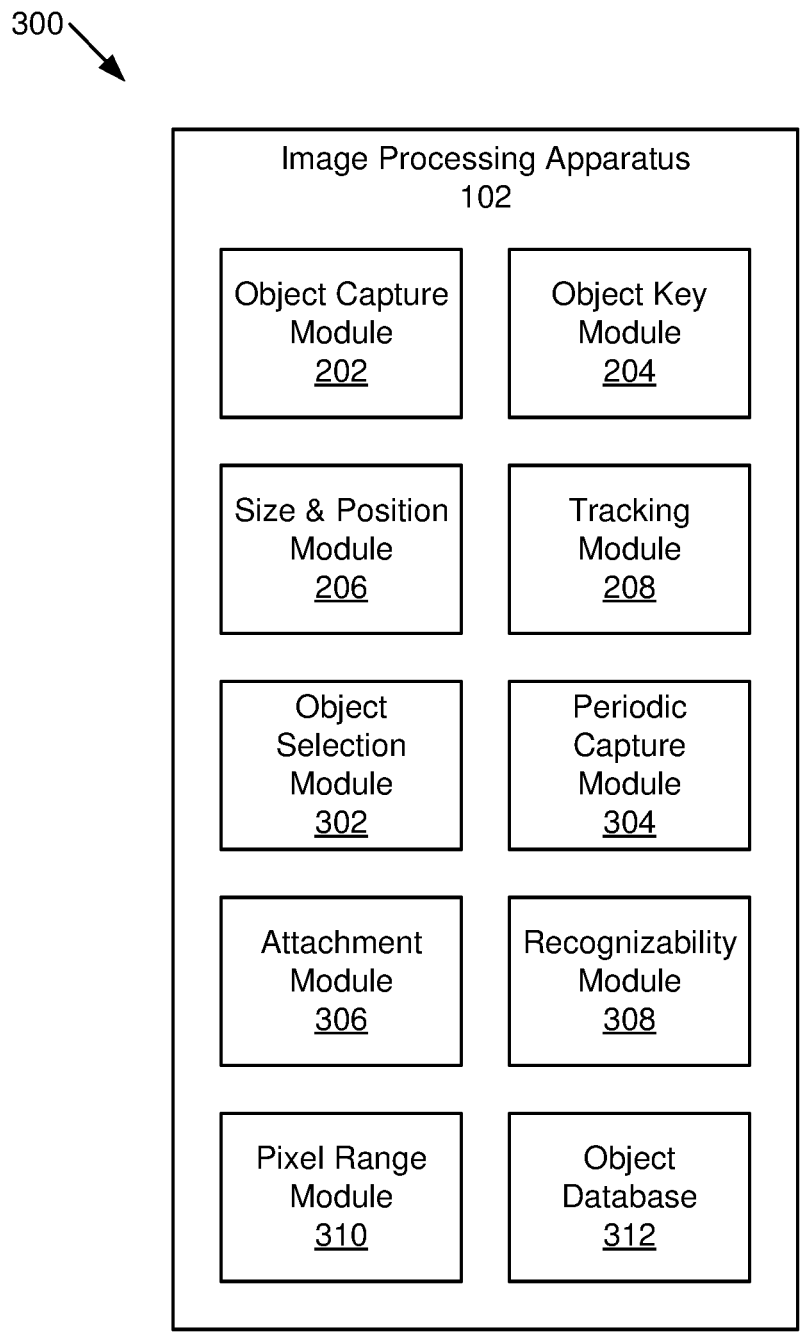
FIG. 3 is a schematic block diagram illustrating another apparatus for using an object key to deprioritize processing of relative regions of images of an object, according to various embodiments.

FIG. 3 is a schematic block diagram illustrating another apparatus 300 for using an object key 120 to deprioritize processing of relative regions of images of an object 130, according to various embodiments. The apparatus 300 includes another image processing apparatus 102 that includes an object capture module 202, an object key module 204, a size and position module 206, and a tracking module 208, which are substantially similar to those described above in relation to the apparatus 200 of FIG. 2. The apparatus 300, in various embodiments, includes an object selection module 302, a periodic capture module 304, an attachment module 306, a recognizability module 308, a pixel range module 310, and/or an object database 312, which are described below.

The apparatus 300 includes, in some embodiments, an object selection module 302 configured to select the object 130 for tracking. In some embodiments, the object selection module 302 selects the object 130 and identifies the object 130 to the object capture module 202 for capturing the image of the object 130. In some embodiments, the object selection module 302 selects the object 130 based on user input. In other embodiments, the object selection module 302 selects the object 130 based on the object 130 entering a field of view of an image capture device 104.

In other embodiments, the object selection module 302 selects the object 130 automatically based on particular criteria, such as a particular type of object 130. For example, the object selection module 302 may select an object 130 that is a person in a field of view of an image capture device 104 while not selecting other potential objects, like a dog or a cat passing through the field of view. In other embodiments, the object selection module 302 selects an object 130 that is a particular person based on features of the person. In some examples, the object selection module 302 uses a facial recognition algorithm to select a person as the object 130. One of skill in the art will recognize other ways for the objection selection module 302 to select an object 130.

In some embodiments, the apparatus 300 includes a periodic capture module 304 configured to periodically capture an image of portions of the object 130 that are not the object key 120 at a resolution sufficient to verify that the object 130 is attached to the object key 120. For example, attachment of the object key 120 to the object 130 may not be permanent and the periodic capture module 304 verifies on a periodic basis that the object key 120 is attached to the object 130 by capturing an image of the object 130 at a high enough resolution to verify attachment. Additionally, periodically capturing an image of the object 130 provides a mechanism to identify any changes to the object 130. For example, if the object 130 is a vehicle, an image of the vehicle captured by the periodic capture module 304 might be able to identify a change to the vehicle, for example if the vehicle was in a crash. Where the object 130 is a person and the object key 120 is a hat, the periodic capture module 304 is able to verify that a different person is not wearing the hat.

In some embodiments, the periodic capture module 304 and/or the attachment module 306, as described below, determines a degree of attachment between the object key 120 and the object 130 and the periodic capture module 304 is configured to determine a verification rate based on the degree of attachment and is configured to periodically capture, at the verification rate, an image of the object 130 at a resolution sufficient to verify that the object 130 is attached to the object key 120. In some embodiments, a higher degree of attachment results in a lower verification rate than a lower degree of attachment. Thus, when the degree of attachment is low, the periodic capture module 304 captures images of the object 130 at a higher rate than when the degree of attachment is high.

In other embodiments, the periodic capture module 304 is configured to capture an image of the object 130 in other situations. For example, when the tracking module 208 is tracking the object key 120 with a first image capture device 104 and determines that the object key 120 has moved into a field of view of a second image capture device 104, the periodic capture module 304 captures an image of the object 130 before the tracking module 208 switches to track using the second image capture device 104. In other embodiments, the periodic capture module 304 captures an image of the object 130 after detecting a reduction of fidelity of an image of the object key 120, after interruption of tracking of the object key 120, when the object 130 rotates and the object key 120 is not visible, and the like. One of skill in the art will recognize other situations where the periodic capture module 304 is configured to capture an image of the object 130 at a resolution sufficient to verify attachment of the object key 120 to the object 130.

In some embodiments, the apparatus 300 includes an attachment module 306 configured to, in response to the object key module 204 identifying one or more object keys 120, determines a degree of attachment between each of the one or more object keys 120 and the object 130. In some embodiments, the attachment module 306 uses a range for the degree of attachment. For example, the degree of attachment may be on a scale of 1 to 10 where a 1 is very loosely attached and a 10 is permanently attached. For example, the attachment module 306 might assign a hat on a person a 2, a shirt on a person a 4, and the face of a person a 10. In other embodiments, the range is on another scale, such as zero to 100 percent, A to D, 1 to 5, 0 to 1.0, etc.

In some embodiments, the attachment module 306 references an attachment database that includes a degree of attachment for known objects 130 and known object keys 120 of the objects 130. In other embodiments, the attachment module 306 receives user input to determine a degree of attachment. In other embodiments, the attachment module 306 uses a machine learning algorithm to calculate a degree of attachment of various objects 130 and attached object keys 120 where the machine learning algorithm receives input from a number of sources, such as user input, a knowledge base, historical information, etc. The attachment module 306, in some embodiments, uses the machine learning algorithm to periodically or continuously update an attachment database. In some embodiments, the attachment database is the object database 312, as described below.

The apparatus 300, in some embodiments, includes a recognizability module 308 configured to determine a degree of recognizability of each of the plurality of object keys 120 where the degree of recognizability of an object key 120 of the plurality of object keys 120 includes a measure of physical properties of the object key sufficient for tracking the one or more locations of the object 130 by capturing the plurality of images of the object key 120. The recognizability module 308, in some embodiments, uses features such as text, numbers, designs, patterns, lines, and other features of an object key 120 to determine a degree of recognizability of the object key 120. In some embodiments, the recognizability module 308 uses a range of degrees of recognizability where a low score represents an object key 120 that is not recognizable or hard to track and a high score indicates an object key 120 with physical features that make tracking the object key 120 easy. One of skill in the art will recognize other ways for the recognizability module 308 to determine a degree of recognizability for each potential object key 120.

In some embodiments, the object key module 204 is configured to select an object key 120 of one or more of object keys 120 based on the degree of attachment and the degree of recognizability of each object key 120 of the one or more object keys 120. In some embodiments, where there are a plurality of object keys 120 of an object 130, the object key module 204 is configured to determine an object key score for each potential object key 120 and the object key module 204 selects an object key 120 with a highest object key score. For example, the object key module 204 may determine an object key score of a potential object key 120 by using a weighted average between the degree of attachment and the degree of recognizability of an object key 120 and then selects an object key 120 with a highest object key score. In other embodiments, the object key module 204 eliminates potential object keys 120 that are below the minimum size limit or have a size that is above a maximum percentage of a size of the object 130.

In other embodiments, the object key module 204 uses a minimum degree of attachment and/or a minimum degree of recognizability to eliminate potential object keys 120. In other embodiments, where no potential object key 120 meets the minimum size limit, has a size is below a maximum percentage of the object 130, has a degree of attachment above the minimum degree of attachment, and/or has a degree of recognizability above the minimum degree of recognizability, the image processing apparatus 102 tracks the object 130 using image capture data for the entire object 130 that is not reduced for any particular area of the object 130. In other embodiments, the object key module 204 uses other criteria to select an object key 120, such as a location of a potential object key 120 with respect to the object and a position of image capture devices 104. For example, the object key module 204 may select object keys 120 on top of an object where image capture devices 104 are overhead.

In some embodiments, the apparatus 300 includes a pixel range module 310 configured to, in response to the size and position module 206 calculating the relative size the location of the object key 120 with respect to the object 130, determine a pixel range of the portions of the object 130 that are not the object key 120. The tracking module 208 tracking the one or more locations of the object 130 includes capturing pixels of portions of the object 130 that are not the object key 120 at a lower resolution and/or a lower rate than a resolution and/or rate sufficient for tracking movement of the object key 120. In other embodiments, capturing pixels of portions of the object 130 that are not the object key 120 at a lower resolution and/or a lower rate than a resolution and/or rate sufficient for tracking movement of the object key 120 includes deprioritizing processing of the pixels of the portions of the object 130 that are not the object key 120, lowering a fidelity of the pixels of the portions of the object 130 that are not the object key 120, and/or avoiding sending the pixels of the portions of the object 130 that are not the object key 120 to a remote processing entity. While embodiments described herein discuss tracking portions of the object 130 not including the object key 120 at a lower resolution, it is understood that tracking at a lower resolution also includes tracking at a lower rate, deprioritizing processing, and other techniques to lower processing load of the image processing apparatus 102.

In some embodiments, the object key module 204 matches the object 130 with an object entry in an object database 314 and the object entry includes one or more object keys 120 for the object and the object key module 204 selects an object key 120 from the object entry in the object database 312. For example, the object database 312 may include various object entries each corresponding to a different object 130. Each object entry of the object database 312 includes information about an object 130 and various object keys 120 of the object 130 and may also include other information, such as a degree of attachment for each object key 120, a degree of recognizability for each object key 120, and the like.

In some embodiments, the image processing apparatus 102 uses a machine learning algorithm to update contents of the object database 312. In some embodiments, the machine learning algorithm uses original entries in the object database 312 and then uses user input, online information about objects, and the like to update the object database 312. One of skill in the art will recognize other ways for the object key module 204 to use an object database 312 and for the image processing apparatus 102 to maintain and update the object database 312 using machine learning.

Figure 4:
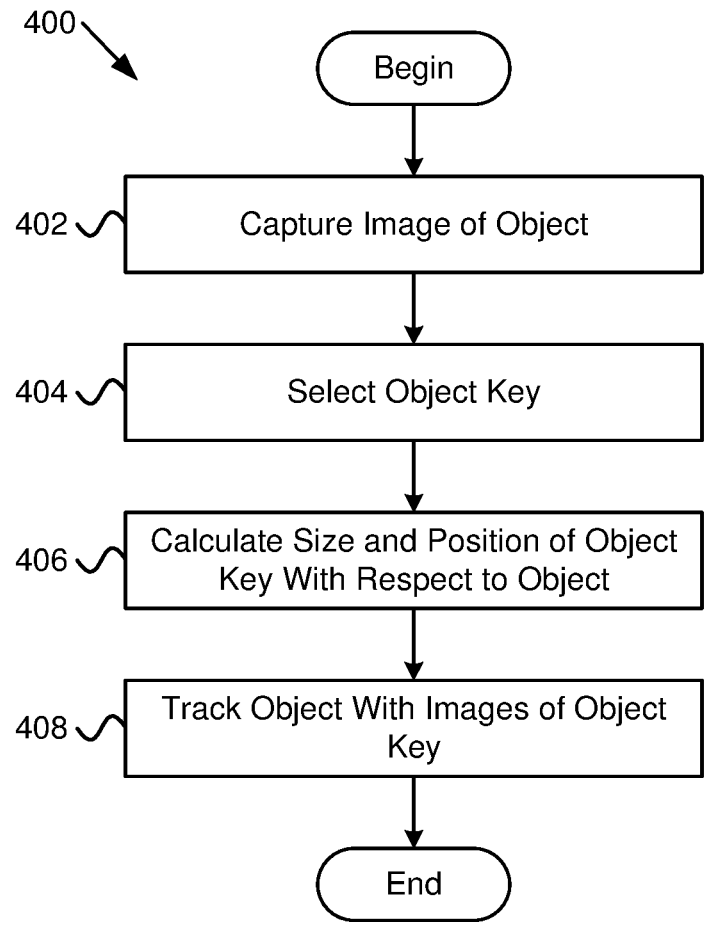
FIG. 4 is a schematic flow chart diagram illustrating a method for using an object key to deprioritize processing of relative regions of images of an object, according to various embodiments.

FIG. 4 is a schematic flow chart diagram illustrating a method 400 for using an object key 120 to deprioritize processing of relative regions of images of an object 130, according to various embodiments. The method 400 begins and captures 402 an image of an object 130 to be tracked and selects 404 an object key 120 of the object 130. The object key 120 includes a portion of the object 130, the object key 120 is attached to the object 130 and is recognizable by an image capture device 104. The method 400 calculates 406 a relative size of the object key 120 with respect to a size of the object 130 and a location of the object key 120 with respect to the object 130.

The method 400 tracks 408 one or more locations of the object 130 from the relative size and location of the object 130 with respect to the object key 120 and by capturing a plurality of images of the object key 120 at a resolution sufficient for tracking movement of the object key 120, and the method 400 ends. In various embodiments, all or a portion of the method 400 is implemented using the object capture module 202, the object key module 204, the size and position module 206, and/or the tracking module 208.

Figure 5A:
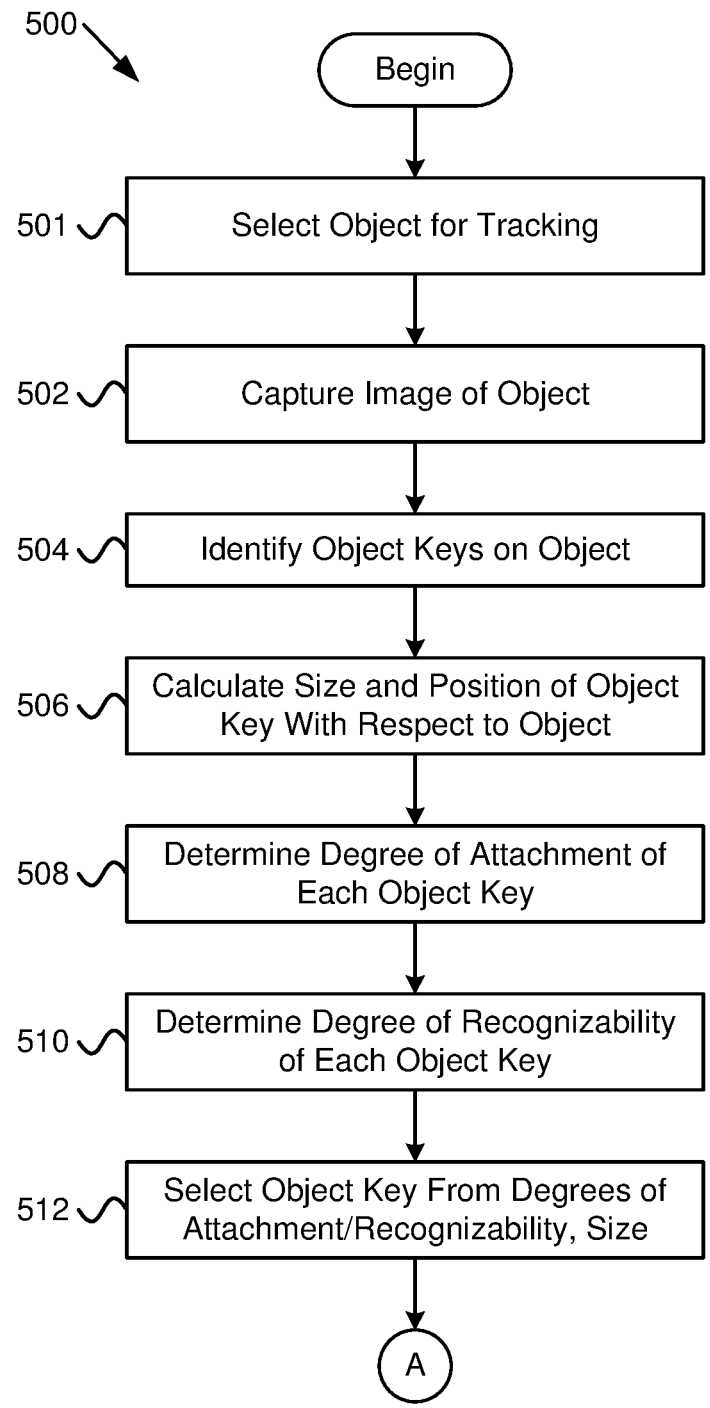
FIG. 5A is a first part of a schematic flow chart diagram illustrating another method for using an object key to deprioritize processing of relative regions of images of an object, according to various embodiments.
Figure 5B:
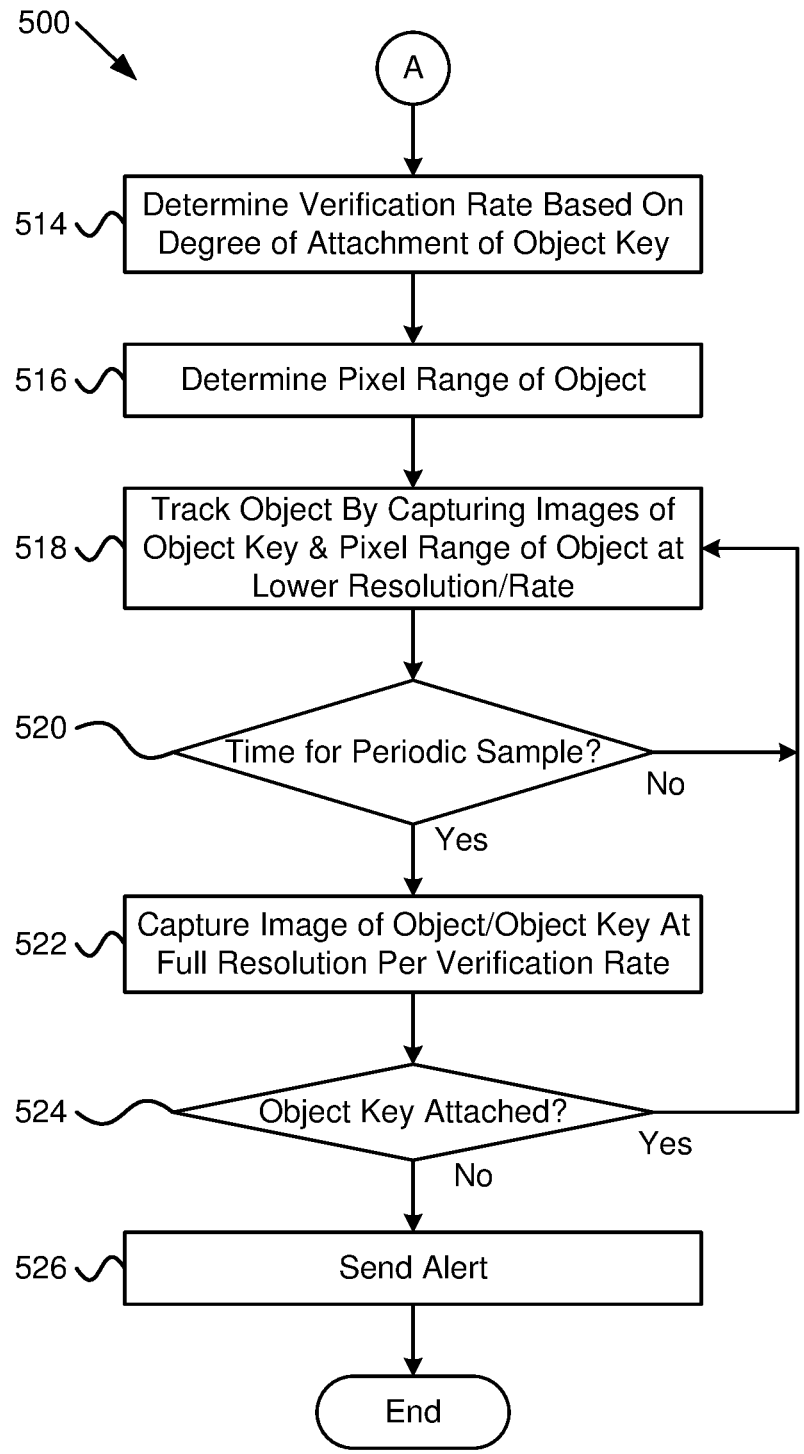
FIG. 5B is a second part of the schematic flow chart diagram of FIG. 5A.

FIG. 5A is a first part and FIG. 5B is a second part of a schematic flow chart diagram illustrating another method 500 for using an object key 120 to deprioritize processing of relative regions of images of an object 130, according to various embodiments. The method 500 begins and selects 501 and object 130 for tracking and captures 502 an image of the object 130 to be tracked. The method 500 identifies 504 a plurality of potential object keys 120 within the image of the object 130 and calculates 506 a relative size of each of the plurality of potential object keys 120 with respect to a size of the object 130 and a location of each of the plurality of potential object keys 120 with respect to the object 130.

The method 500 determines 508 a degree of attachment between each of the plurality of potential object keys 120 and the object 130 and determines 510 a degree of recognizability of each of the plurality of potential object keys 120. The degree of recognizability of an object key 120 of the plurality of potential object keys includes a measure of physical properties of the object key 120 sufficient for tracking locations of the object 130 by capturing the plurality of images of the object key 120.

The method 500 selects 512 an object key 120 of the plurality of potential object keys 120 based on a size and location of each of the potential object keys 120, and the degree of attachment and the degree of recognizability of each of the plurality of potential object keys 120. The method 500 determines 514 a verification rate based on the degree of attachment of the object key 120 to the object 130 (follow "A" on FIG. 5A to "A" on FIG. 5B). A higher degree of attachment results in a lower verification rate than a lower degree of attachment. The method 500 determines 516 a pixel range of the portions of the object 130 that are not the object key 120 and tracks 518 one or more locations of the object from the relative size and location of the object 130 with respect to the object key 120 and by capturing a plurality of images of the object key 120 at a resolution sufficient for tracking movement of the object key 120 and capturing pixels of portions of the object 130 that are not the object key 120 at a lower resolution and/or a lower rate than a resolution and/or rate sufficient for tracking movement of the object key 120.

The method 500 determines 520, based on the verification rate, if it is time for a periodic sample of a full image of the object 130. If the method 500 determines 520 that it is not time for a periodic sample, the method 500 returns and continues to track 518 the object 130 by capturing images of the object key 120. If the method 500 determines 520 from the verification rate that it is time for a periodic sample, the method 500 captures 522 an image of the object 130 and object key 120 at a resolution sufficient to determine if the object key 120 is attached to the object 130. The method 500 determines 524 from the captured image of the object 130 and object key 120 if the object key 120 is attached to the object 130.

If the method 500 determines 524 that the object key 120 is attached to the object 130, the method 500 returns and continues to track 518 the object 130 by capturing images of the object key 120. If the method 500 determines 524 that the object key 120 is not attached to the object 130, the method 500 sends 526 an alert and the method 500 ends. In various embodiments, all or a portion of the method 500 is implemented using the object capture module 202, the object key module 204, the size and position module 206, the tracking module 208, the object selection module 302, the periodic capture module 304, the attachment module 306, the recognizability module 308, the pixel range module 310, and/or the object database 312.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    capturing, using an image capture device, an image of an object to be tracked;
    analyzing, using the image capture device, the image of the object to identify one or more recognizable portions of the object;
    selecting an object key of the object, the object key comprising a portion of the one or more recognizable portions of the object, the object key attached to the object and comprising recognizable features, wherein the object key is recognizable by the image capture device based on the recognizable features of the object key, the object key comprising a portion of the object visible in a same light spectrum as the object;
    calculating a relative size of the object key with respect to a size of the object and a location of the object key with respect to the object;
    tracking one or more locations of the object from the relative size and location of the object with respect to the object key and based on capturing a plurality of images of the object key, using one or more image capture devices, at a resolution sufficient to identify the recognizable features of the object key and to track movement of the object key; and
    periodically capturing, at a rate lower than a rate for the capturing of the plurality of images of the object key, an image of portions of the object that are not the object key at a resolution sufficient to identify recognizable features of the portions of the object that are not the object key and using the capture of the image of the portions of the object that are not the object key to verify that the object is still attached to the object key.

2. The method of claim 1, wherein tracking the one or more locations of the object comprises:
    capturing images of portions of the object that are not the object key at a lower resolution than the resolution sufficient to identify the recognizable features of the object key while tracking movement of the object key; and/or
    capturing images of portions of the object that are not the object key at a lower rate than a rate of capturing images of the plurality of images of the object key.

3. The method of claim 1, wherein tracking the one or more locations of the object comprises capturing images of the object key without capturing images of portions of the object that are not the object key.

4. The method of claim 1, further comprising:
    determining a degree of attachment between the object and the object key;

determining a verification rate based on the degree of attachment, wherein a higher degree of attachment results in a lower verification rate than a lower degree of attachment; and periodically capturing, at the verification rate, an image of the object at a resolution sufficient to identify recognizable features of the object to verify that the object is still attached to the object key.

5. The method of claim 1, wherein the captured image of the object is captured with an image capture device, and wherein the captured plurality of images of the object key are captured using one or more image capture devices and wherein one or more image capture devices capturing the image of the object and the plurality of images of the object key use visible light, infrared light, and/or thermal imaging.

6. The method of claim 1, further comprising identifying, in response to capturing the image of the object, the object key within the image of the object, wherein the object key is a recognizable element of the object with physical properties sufficient to identify the recognizable features of the object key and to track the one or more locations of the object by capturing the plurality of images of the object key.

7. The method of claim 1, further comprising:
identifying, in response to capturing the image of the object, a plurality of potential object keys within the image of the object;
determining a degree of attachment between each of the plurality of potential object keys and the object; and
determining a degree of recognizability of each of the plurality of potential object keys, the degree of recognizability of an object key of the plurality of potential object keys comprising a measure of physical properties of the object key sufficient to identify the recognizable features of the object key and to track the one or more locations of the object by capturing the plurality of images of the object key,
wherein selecting the object key of the object comprises selecting an object key of the plurality of potential object keys based on the degree of attachment and the degree of recognizability of each object key of the plurality of potential object keys.

8. The method of claim 1, further comprising, in response to calculating the relative size of the object key with respect to the size of the object and the location of the object key with respect to the object, determining a pixel range of the portions of the object that are not the object key, wherein tracking the one or more locations of the object comprises capturing pixels of portions of the object that are not the object key at a lower resolution and/or a lower rate than a resolution and/or rate sufficient to identify the recognizable features of the object key and to track movement of the object key.

9. The method of claim 8, wherein capturing pixels of portions of the object that are not the object key at a lower resolution and/or a lower rate than a resolution and/or rate sufficient to identify the recognizable features of the object key and to track movement of the object key comprises deprioritizing processing of the pixels of the portions of the object that are not the object key, lowering a fidelity of the pixels of the portions of the object that are not the object key, and/or avoiding sending the pixels of the portions of the object that are not the object key to a remote processing entity.

10. The method of claim 1, wherein selecting the object key is based on a minimum size limit, the minimum size limit comprising a smallest size for a potential object key to be selected based on capabilities of the image capture device.

11. An apparatus comprising:
a processor; and
a memory storing code, the code being executable by the processor to perform operations comprising:
capturing, using an image capture device, an image of an object to be tracked;
analyzing, using the image capture device, the image of the object to identify one or more recognizable portions of the object;
selecting an object key of the object, the object key comprising a portion of the one or more recognizable portions of the object, the object key attached to the object and comprising recognizable features, wherein the object key is recognizable by the image capture device based on the recognizable features of the object key, the object key comprising a portion of the object visible in a same light spectrum as the object;
calculating a relative size of the object key with respect to a size of the object and a location of the object key with respect to the object; and
tracking one or more locations of the object from the relative size and location of the object with respect to the object key and based on capturing a plurality of images of the object key, using one or more image capture devices, at a resolution sufficient to identify the recognizable features of the object key and to track movement of the object key; and
periodically capturing, at a rate lower than a rate for the capturing of the plurality of images of the object key, an image of portions of the object that are not the object key at a resolution sufficient to identify recognizable features of the portions of the object that are not the object key and using the capture of the image of the portions of the object that are not the object key to verify that the object is still attached to the object key.

12. The apparatus of claim 11, wherein tracking the one or more locations of the object comprises:
capturing images of portions of the object that are not the object key at a lower resolution than the resolution sufficient to identify the recognizable features of the object key while tracking movement of the object key;
capturing images of portions of the object that are not the object key at a lower rate than a rate of capturing images of the plurality of images of the object key; and/or
capturing images of the object key without capturing images of portions of the object that are not the object key.

13. The apparatus of claim 11, the operations further comprising:
determining a degree of attachment between the object and the object key;
determining a verification rate based on the degree of attachment, wherein a higher degree of attachment results in a lower verification rate than a lower degree of attachment; and
periodically capturing, at the verification rate, an image of the object at a resolution sufficient to identify recognizable features of the object to verify that the object is still attached to the object key.

14. The apparatus of claim 11, wherein the captured image of the object is captured with an image capture device, and wherein the captured plurality of images of the object key are captured using one or more image capture devices.

15. The apparatus of claim 11, the operations further comprising identifying, in response to capturing the image of the object, the object key within the image of the object, wherein the object key is a recognizable element of the object with physical properties sufficient to identify the recognizable features of the object key and to track the one or more locations of the object by capturing the plurality of images of the object key.

16. The apparatus of claim 11, the operations further comprising:
   identifying, in response to capturing the image of the object, a plurality of potential object keys within the image of the object;
   determining a degree of attachment between each of the plurality of object keys and the object; and
   determining a degree of recognizability of each of the plurality of object keys, the degree of recognizability of an object key of the plurality of object keys comprising a measure of physical properties of the object key sufficient to identify the recognizable features of the object key and to track the one or more locations of the object by capturing the plurality of images of the object key,
   wherein selecting the object key of the object comprises selecting an object key of the plurality of object keys based on the degree of attachment and the degree of recognizability of each object key of the plurality of object keys.

17. A program product comprising a non-volatile computer readable storage medium storing code, the code being configured to be executable by a processor to perform operations comprising:
   capturing, using an image capture device, an image of an object to be tracked;
   analyzing, using the image capture device, the image of the object to identify one or more recognizable portions of the object;
   selecting an object key of the object, the object key comprising a portion of the one or more recognizable portions of the object, the object key attached to the object and comprising recognizable features, wherein the object key is recognizable by the image capture device based on the recognizable features of the object key, the object key comprising a portion of the object visible in a same light spectrum as the object;
   calculating a relative size of the object key with respect to a size of the object and a location of the object key with respect to the object; and
   tracking one or more locations of the object from the relative size and location of the object with respect to the object key and based on capturing a plurality of images of the object key, using one or more image capture devices, at a resolution sufficient to identify the recognizable features of the object key and to track movement of the object key; and
   periodically capturing, at a rate lower than a rate for the capturing of the plurality of images of the object key, an image of portions of the object that are not the object key at a resolution sufficient to identify recognizable features of the portions of the object that are not the object key and using the capture of the image of the portions of the object that are not the object key to verify that the object is still attached to the object key.

18. The program product of claim 17, wherein tracking the one or more locations of the object comprises:
   capturing images of portions of the object that are not the object key at a lower resolution than the resolution sufficient to identify the recognizable features of the object key while tracking movement of the object key; and/or
   capturing images of portions of the object that are not the object key at a lower rate than a rate of capturing images of the plurality of images of the object key.

* * * * *